3,524,663
RELEASABLE DRIVE COUPLING
Frank H. Mueller, John J. Smith, and Lynn D. Edwards, Decatur, Ill., assignors to Mueller Company, Decatur, Ill., a corporation of Illinois
Continuation-in-part of application Ser. No. 649,338, June 27, 1967. This application May 16, 1969, Ser. No. 825,383
Int. Cl. B60b 27/06
U.S. Cl. 287—53                                                    4 Claims

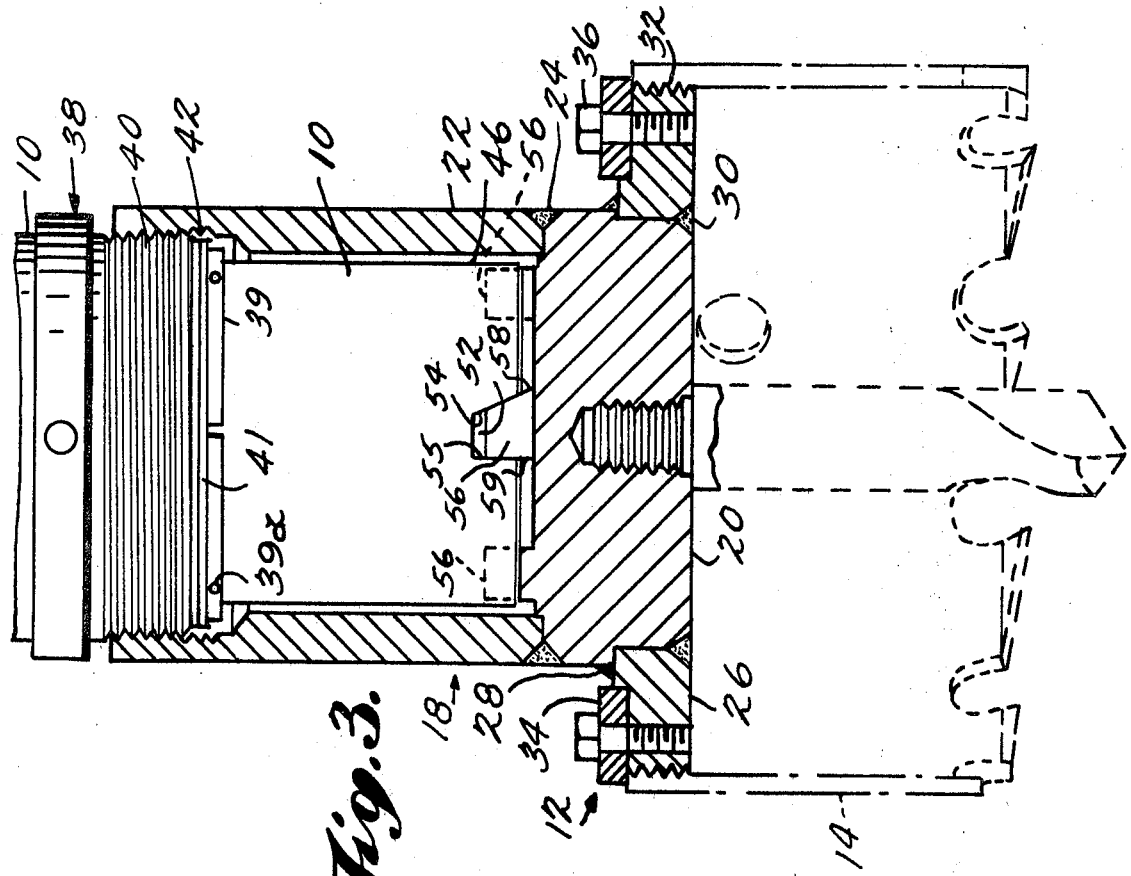
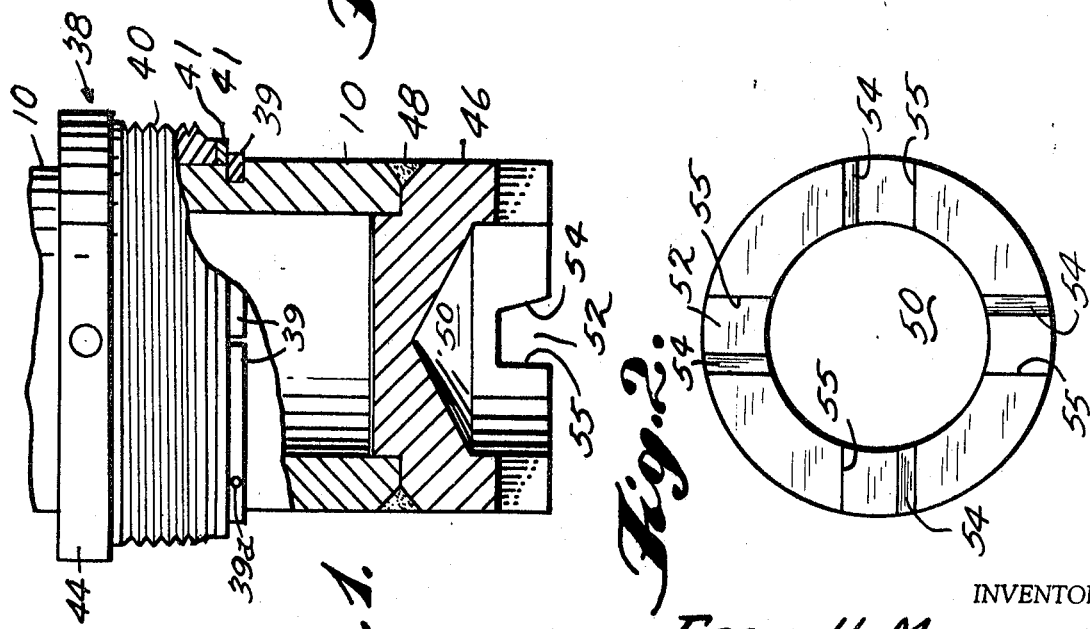
INVENTORS
FRANK H. MUELLER
JOHN J. SMITH
LYNN D. EDWARDS
BY Cushman, Darby & Cushman
ATTORNEYS

United States Patent Office 3,524,663
Patented Aug. 18, 1970

---

ABSTRACT OF THE DISCLOSURE

A drive coupling between a rotatable work-engaging tool and a power-driven shaft includes axially facing teeth carried at the free end of the shaft, a sleeve carrying the tool at one end having its other end telescoped over the toothed end of the shaft, complementary teeth carried within the sleeve, rotatable slidable collar on the shaft threadedly engaged with the sleeve to draw the complementary teeth into interlocking engagement and a ring clamped on the shaft to retain the collar thereon.

---

DISCLOSURE

This is a continuation-in-part of application Ser. No. 649,338, filed June 27, 1967.

The present invention relates to a rotatable power-driven tool and more particularly to improvements in a coupling for releasably connecting a work-engaging head to a power-driven shaft for rotation therewith.

Rotatable tools of the type under consideration typically include a rotatable driven shaft which is adapted to be detachably, or is permanently, connected to a source of power and a work-engaging head which is rotated by the driven shaft. Typically the driving connection between the driven shaft and the head consists of a tooth or lug configuration on one part engaging a complementary notch or recess configuration in the other part so that the parts rotate together. The complementary surfaces are held in engagement with each other by means of a separate releasable connection which prevents relative longitudinal movement between the parts. The latter connection may be merely a pin or bolt extending through a sleeve on one of the parts and projecting into a hole in the other part which is disposed in the sleeve.

It is the object of the present invention to provide a rotatable tool of this general type in which the connections between the work-engaging head and the driven shaft effect a greater degree of alignment and rigidity between the parts than the conventionally employed connections. One feature of the improved connection is the provision of a threaded rotatable collar or the like, carried by one of the parts, which when rotated engages complementary threads on the other part and at the same time draws the parts together so as to cause tight interengagement of the complementary tooth and notch members. A second feature is the provision of tapered, wedging surfaces on the tooth and notch members so that as these surfaces are drawn together by rotation of the collar they effect accurate alignment of the two parts. Preferably the drive sides of the teeth are straight while the trailing sides are inclined.

One form of tool in which the present invention may be embodied is a shell cutter, a machine including a hollow cylindrical cutting element adapted to cut an annular hole in a metal wall, a hub fixed to the cutting element and a power-driven rotatable boring bar cooperating with the hub. The invention is further described and illustrated in this environment, but it will be understood that the principles involved are applicable to other types of rotatable tools.

In the drawings:

FIG. 1 is an elevational view, partly in section of the free end of a rotatable driven shaft embodying the principles of the present invention;

FIG. 2 is an end view of the boring bar of FIG. 1; and

FIG. 3 is an elevational view, partly in section, of the boring bar of FIG. 1 with a work-engaging head connected thereto.

In FIG. 1 there is shown a driven shaft 10, such as the cylindrical boring bar of a shell cutting drilling machine, having a free end portion adapted to be releasably connected to a work-engaging part or assembly 12, the latter being shown in FIG. 3. The upper end (not shown) of the boring bar 10 is connected to a source of rotatable power in any suitable manner so that in the combination described herein the boring bar 10 may be considered as a rotatably driven shaft, that is the driving shaft for the assembly 12. As shown, the boring bar 10 is of hollow construction, although this is not of significance in the present invention.

The work-engaging part or assembly 12, illustrated in FIG. 3, is shown as including a hollow cylindrical cutter 14 which may be of conventional construction, a pilot drill 16, also conventional, and a hub 18 which embodies the principles of the present invention. As shown, the hub 18 consists of several parts welded together but it will be understood that the present invention does not require any particular assembly of parts. In the particular embodiment illustrated the hub includes a base 20, an upwardly extending sleeve 22 welded concentrically to the top of the base 20 at 24 and an outer ring 26 welded to the periphery of the base 20 at 28 and 30. The outer circumference of the outer ring 26 is threaded at 32 to engage complementary interior threads on the cutter 14. An upper ring 34 is bolted to the outer ring 26 with bolts 36 and serves as a stop for the cutter 14 when the latter is screwed onto the ring 26. When it is desired to remove the cutter 14 for repair or replacement, the upper ring 34 is loosened first. This permits easy unscrewing of the cutter 14 even though the direction of the threads 32 is such that the cutter 14 tends to tighten during a drilling operation.

The connection between the boring bar 10 and the cutting assembly 12, according to the principles of the present invention, includes a rotatable threaded collar or the like which draws the parts together and further includes a modified tooth-and-notch configuration which accurately aligns the parts and transmits rotary motion from the boring bar 10 to the cutting assembly 12.

In the embodiment described herein the collar, shown at 38, is carried by the boring bar 10 above the lower end thereof and concentric thereto by means of a connection which permits the collar 38 to rotate relative to the bar 10 while preventing the collar 38 from sliding off the bar 10 in an axial direction. In the preferred construction a split, or two-piece retaining ring 39 is fitted into a circumferential groove in the bar 10. Each piece is positively secured in place with suitable screws, one of which is shown at 39a, to prevent loosening of the ring by vibration during operation. The outside diameter of the ring 39 is greater than the diameter of the bar 10 and supports a spacer washer 41 which in turn prevents the collar 38 from sliding off the bar 10. A portion of the periphery of the collar is threaded, as shown at 40, for engagement with complementary interior threads 42 on the sleeve 22 of the cutting assembly 12. Above the threaded portion 40 is an enlarged portion 44 adapted to be grasped manually for rotating the collar 38.

The tooth-and-notch configuration between the boring bar 10 and the cutting assembly 12 employs tapered wedging surfaces which serve to align the latter accurately with the boring bar 10 and which, in combination with the action of the collar 38, effect a very rigid connection between the bar 10 and the assembly 12. The lower end of the boring bar 10 is provided with a cylindrical fitting 46, welded in place at 48, which terminates in a socket-like configuration defined by a large central hole 50 and four notches or recesses 52 disposed about the axis of the bar 10 at 90° intervals. The trailing side wall 54 of each recess 52 is inclined upwardly and inwardly to give a tapered or wedge shape to the recess 52. The other side wall 55, that is the driving wall, is parallel to the axis of rotation.

The cutting assembly 12 is provided with upwardly extending teeth or lugs 56 having an inclined side wall 58 and a straight side wall 59 which are complementary to and engageable with the side walls 54 and 55, respectively, of the recesses 52. As seen in FIG. 3, the teeth 56 are integral with the base 20 of the hub 18 and disposed concentrically within the sleeve 22. Only the side walls of the teeth 56 and the recesses 52 engage in the completely assembled tool, as shown in FIG. 3, and this assures a continuous centering action and continuous restraint against any relative rotational movement between the boring bar 10 and the cutting assembly 12. At the same time the combination of straight driven faces and inclined trailing faces reduces the load on the retaining ring 39 and makes the connection less sensitive to vibration. Accordingly, this configuration is preferred, although under some circumstances the drive faces may also be inclined upwardly and inwardly.

The complete tool, as shown in FIG. 3, is assembled by slipping the sleeve 22 of the previously assembled cutting assembly 12 over the lower end of the boring bar 10 and moving the parts together until the threaded portion 40 of the collar 38 engages the interior threads 42 on the sleeve 22. As seen in FIG. 3, the end of the bar 10 fits loosely in the sleeve. Then the operator grasps the enlarged portion 44 of the collar 38 and rotates the collar 38 in a direction to further engage the threads 40 and 42, thereby drawing the entire cutting assembly 12 axially toward the boring bar 10. As the parts approach each other it may be necessary to rotate the cutting assembly 12 slightly to effect initial alignment of the projections 56 with the recesses 52. Continued rotation of the collar 38 engages the side walls 58 and 59 of the teeth 56 with the side walls 54 and 55, respectively, of the recesses with a resulting camming action which aligns the cutting assembly 12 positively with the boring bar 10. At the same time there is a wedging action which, when the collar 38 has been fully tightened, prevents any relative rotation between the cutting assembly 12 and the boring bar. The engaged surfaces 54 and 58, and 55 and 59, are the bearing surfaces for both rotative forces and compressive forces between the cutting assembly 12 and the boring bar with the result that the threaded connection 40, 42 is not subject to high stress during use of the tool. As is evident from FIG. 3, the surfaces of the teeth 56 and the recesses 52 become fully engaged with each other before the threads 40 and 42 fully engage, thereby assuring a tight fit.

While preferred embodiments of the present invention have been described, further modifications may be made without departing from the scope of the invention.

What is claimed is:

1. A releasable coupling arrangement between a rotatable driving part of a tool and a work-engaging driven part wherein said parts are connectable end-to-end for rotation about the axis of the driving part, said arrangement comprising:

a sleeve rigidly affixed to and concentric with said driven part, said sleeve having an inner end and an open outer end which faces the end of said driving part and which receives the latter;

a collar mounted on the outer periphery of the end portion of said driving part concentric with said axis for independent rotational and independent axial movement relative thereto;

means on the outer periphery of said end portion of said driving part for retaining said collar on said driving part by preventing axial movement of said collar past said end;

a projection and recess connection between said end of said driving part and said inner end of said sleeve, said connection including a plurality of spaced-apart wedge-shaped teeth-like projections on one of said ends and a plurality of corresponding complementary recesses defined by the other of said ends, said projections and recesses being disposed about said axis and extending parallel to said axis and each of said recesses being of greater axial dimension than the corresponding projection; and a threaded connection between said collar and said sleeve defined by a thread on said collar coaxial therewith and a complementary thread on the outer end of said sleeve, said threads being so located that upon rotation of said collar in a direction to tighten said threads said driven part and said driving part will be drawn together to engage said wedge-shaped projections within said complementary recesses thereby centering said parts with respect to each other and preventing relative rotational movement between said parts.

2. Apparatus as in claim 1 wherein said wedge-shaped, teeth-like projections and said complementary recesses each have an inclined trailing side wall and a straight side wall which is parallel to the axis of rotation of the coupling and through which the rotational drive force is transmitted.

3. Apparatus as in claim 1 wherein said collar is retained on said driving part by means of a ring disposed within a circumferential groove in the exterior of said driving part, and extending radially outwardly of the groove, said groove being located between the end of said driving part and the end of said collar.

4. Apparatus as in claim 3 wherein said ring is a split ring of at least two arcuate parts each of which is secured in place by fastening means.

References Cited

UNITED STATES PATENTS

| 1,104,044 | 7/1914 | Goetz | 287—53 |
| 1,438,040 | 12/1922 | Jones | 279—91 |
| 1,480,355 | 1/1924 | Webster | 287—119 XR |
| 1,501,465 | 7/1924 | Peck | 287—91 |
| 2,210,811 | 8/1940 | Kelpsch | 287—53 |
| 2,231,878 | 2/1941 | Boynton | 285—330 XR |

FOREIGN PATENTS

| 392,878 | 3/1924 | Germany. |
| 829,112 | 2/1960 | Great Britain. |

DAVID J. WILLIAMOWSKY, Primary Examiner

A. V. KUNDRAT, Assistant Examiner

U.S. Cl. X.R.

285—330